(No Model.)
E. SELEN.
DEVICE FOR SUPPORTING VEHICLE SEATS.
No. 531,339. Patented Dec. 25, 1894.
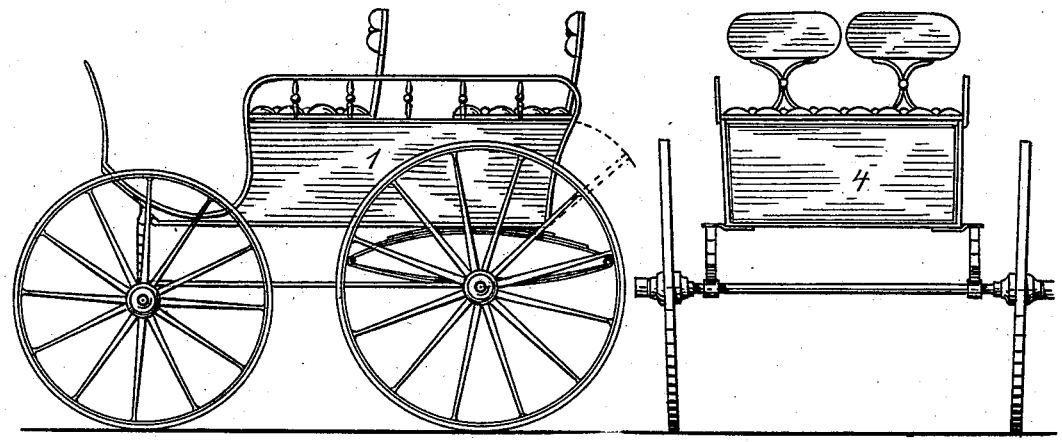
Fig. 1.   Fig. 2.
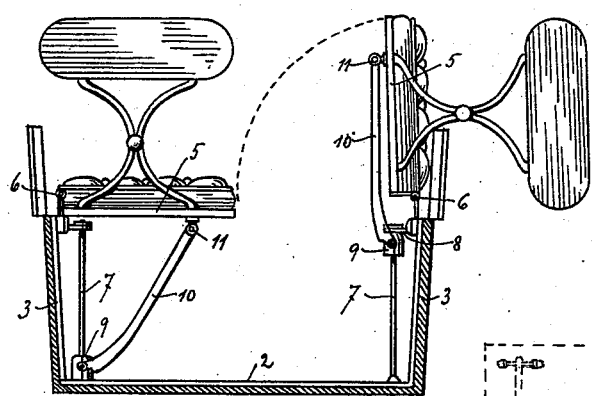   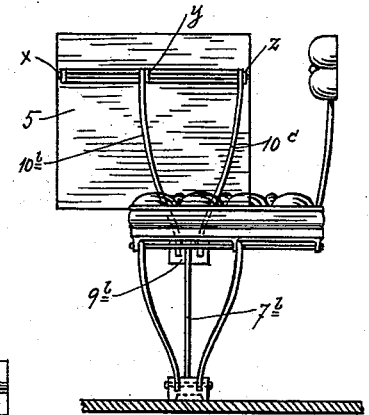
Fig. 3.   Fig. 5.
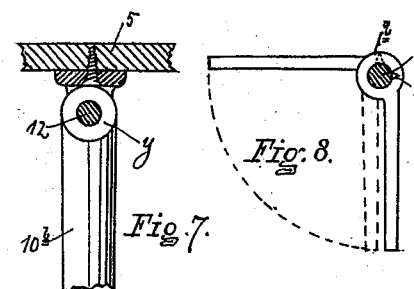   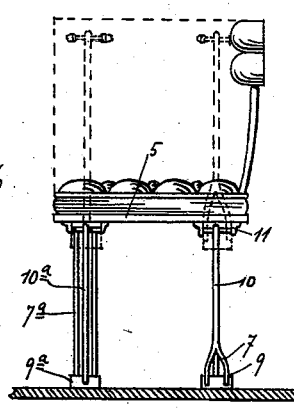   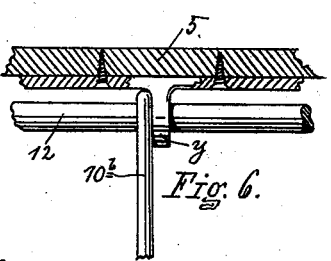
Fig. 7.   Fig. 8.   Fig. 4.   Fig. 6.
WITNESSES.
Rich. A. George.
Thomas F. McGovern.
INVENTOR.
Erik Selen

UNITED STATES PATENT OFFICE.

ERIK SELEN, OF UTICA, NEW YORK.

DEVICE FOR SUPPORTING VEHICLE-SEATS.

SPECIFICATION forming part of Letters Patent No. 531,339, dated December 25, 1894.

Application filed July 25, 1894. Serial No. 518,507. (No model.)

*To all whom it may concern:*

Be it known that I, ERIK SELEN, of Utica, Oneida county, and State of New York, have invented a certain new and useful Mechanical Device for Supporting Seats of Carriages, Vehicles, &c.; and I do hereby declare that the following is a full and exact description of the invention, which will enable others skilled in the art to which it appertains to make and use the same, reference being had to the accompanying drawings, with letters and numerals marked thereon indicating the points and parts of the invention, forming a complete specification and description thereof.

The object of my invention is to provide an easy and convenient access to any and all of the seats of a carriage or vehicle, and also to provide, when desired, a clear passage through the vehicle from one end to the other.

My invention is especially useful to apply to carriages and vehicles adapted to carry three or more persons, such as surreys, traps and others.

Heretofore seats in such vehicles have been supported by cross-bars and other fixed devices which always obstruct the passage through the carriage or vehicle as well as forming an obstruction in getting into and out of the seats.

Figure 1 shows a side view of one of the many kinds of four-passenger carriages or vehicles, to which my invention is particularly adapted. Fig. 2 shows a rear end view of the same vehicle or carriage. Fig. 3 shows a cross section through the body, showing the seat parted in the middle and thus forming a separate seat for each passenger. The figure also plainly shows the end view of the mechanism supporting the seat with its attachments and positions, indicating one of the seats in position for use, and the other turned up in a vertical position, providing a clear opening through the body of the carriage and access to the seats, and also showing the position of the seat supporting devices in position for use and in open position. Fig. 4 shows a side view of the seat and its supporting mechanism, showing in full lines the position for use and in dotted lines the turned-up or open position; the dotted position conforming to the position shown on the right side of Fig. 3. This figure also shows two slightly modified forms of construction of seat-supporting devices in which a single arm is used on one side of the seat operating in connection with a single guide rod, and the other side of the seat is supported by a single bracing arm operating on a double guide. Fig. 5 shows a side view of a modified form of construction in which provision is made for a sidewise or lateral movement of the seat; the dotted lines showing the same in position for use and adjusted to the rear position with reference to its supporting mechanism, and the full lines showing the turned-up or open position adjusted to the front with reference to its supporting mechanism. Fig. 6 shows details of the joint between the supporting or bracing arms and the under side of the seat as seen from the side. Fig. 7 shows the same as Fig. 6, as seen from the end. Fig. 8 shows details of construction of the hinge connecting the seat to the side of the vehicle body, as particularly applicable to the construction shown in Fig. 5.

Referring to the reference numerals in a more particular description of the device, 1 indicates the body of a carriage or vehicle mounted on any suitable running gear. The body consists of the bottom 2 and sides 3, 3, and may also be provided with a rear end or tail-board 4. On the side 3 adjacent to the top thereof, the seat 5 is hinged at 6 to the body, (Fig. 4;) the hinged joint being preferably provided substantially on a line with the upper surface of the seat. Beneath the seat is provided, as shown in Fig. 4, a single upright guide-post 7 at one edge of the seat, and a double guide-post 7ª at the other side. These guide-posts are supported at their upper ends by a bracket 8 and are secured and supported at their lower ends to the bottom close to the side.

In the form of construction shown in Fig. 5, a single guide-post as 7ᵇ, similar to 7 and 7ª, secured and supported in the same manner, is employed and is placed in position to be under the front portion of the seat when the seat is adjusted to its rear position, and under the rear portion when adjusted to its front position. Placed on the guide-post 7 and adapted to slide up and down the same, is a sliding block 9 to which is pivoted the lower end of the bracing arm 10, shown in Fig. 4; the lower end of the arm being forked to engage the block, thus giving a wider base of support. The upper end of the arm 10 is pivoted at 11 to ears or fixtures on the under side of the seat. On the opposite of Fig. 4 and in connection with the double guide-post $7^a$ is provided a sliding block $9^a$ modified to adapt it to run on the double guide-post, and the arm $10^a$ extends between the block $9^a$ and the under side of the seat to each of which it is pivoted similarly to arm 10. The lower end of this arm, however, is not forked, as the double guide-post obviates the necessity thereof.

In the modified form of construction shown in Fig. 5, a pair of supporting arms $10^b$ and $10^c$ are provided in lieu of the arm 10 or $10^a$. These arms being pivoted at their lower ends in the sliding block $9^b$ similar to 9 and $9^a$ and spread at their upper ends and hinged or pivoted to the under side of the seat, as illustrated and hereinafter described. The upper ends of the arms $10^b$ and $10^c$ engage on a rod 12 extending along on the under side of the seat from front to rear and connected thereto with ears $x$, $y$ and $z$.

The hinging joint at 6 used in connection with the construction shown in Figs. 5 and 6, is provided with a long pintle between the hinged parts, and the pintle is provided with a short feather or projection, as shown at $a$ in Fig. 8, adapted when the seat is in open or turned-up position to register with the keyseat or recess $b$ in the hinged part and allow the seat to be slid sidewise when in the open position as stated and as desired, whereby the seat can be adjusted toward the front or the rear of the vehicle, as clearly shown in Fig. 5. In this adjustment the upper ends of the arms $10^a$ and $10^b$ slide along on the rod 12 on the under side of the seat.

The seat in position for use is supported at its swinging edge by the arm 10 or $10^a$, $10^b$ or $10^c$ as before described, depending on the form of construction used with the block 9, $9^a$ or $9^b$ as the case may be, resting on the bottom of the vehicle, or a conical shoulder at the base of the guide-post.

The open position of the seat is limited by the sliding block coming in contact with the bracket 8 at the upper end of the guide-post. The seat can thus be handled without striking any part of the vehicle and injuring the finish.

These seats may be provided in pairs forming when they are in position for use a seat extending from side to side of the body, or they may be used independently as desired.

In order to permit free use and passage through the carriage body and in order to obtain access from either end to any or all of the seats, one or more of them may be turned up as desired and returned to position for use or occupancy.

I do not intend to limit myself to the precise construction and details of parts herein shown and described, as various modifications thereof, other than those herein described, may be made without departing from the principle or equivalents of my invention.

What I claim as new, and desire to secure by Letters Patent, is—

1. The combination with a vehicle body of a seat hinged to the side of the body, a guide-post beneath the seat and a brace for the seat hinged at one end to the seat and running on the guide-post at the other, substantially as set forth.

2. A seat hinged to a support by a sliding hinge, a fixed guide and brace beneath the swinging side of the seat and the guide engaging the seat by a sliding joint which permits the seat to be adjusted laterally, combined substantially as set forth.

3. A seat hinged to a support by a sliding hinge, a lock for holding it in position when in use, a fixed guide and brace between the swinging side of the seat and the guide and engaging the seat by a sliding joint which permits the seat to be adjusted laterally when in unlocked position, substantially as set forth.

In witness whereof I have affixed my signature in presence of two witnesses.

ERIK SELEN.

Witnesses:
 E. WILLARD JONES,
 F. A. BOSWORTH.